United States Patent
Franco

[15] 3,680,750
[45] Aug. 1, 1972

[54] FISHING FLY CASE
[72] Inventor: Louis B. Franco, 12719 E. Alki, Spokane, Wash. 99212
[22] Filed: Nov. 27, 1970
[21] Appl. No.: 93,131

[52] U.S. Cl. .............................224/5 G, 206/DIG. 33
[51] Int. Cl. ..............................................A01k 97/06
[58] Field of Search.........224/5, 8, 2, 3; 206/DIG. 33

[56] References Cited
UNITED STATES PATENTS 2,540,340   2/1951   Linblade........................224/5 G
3,151,790   10/1964   Mavrakis.......................224/5 G Primary Examiner—Philip Arnold
Attorney—Wells, St. John & Roberts

[57] ABSTRACT

A fishing fly case is disclosed for attaching to the clothing of a fisherman, preferably on his chest to enable the fisherman to carry a supply of fishing flies within while fishing. The case has a lid that pivots downward and outward to open the case. The case has two opposing magnetic surfaces to support the flies. A magnifying lens is mounted on the lid to visually facilitate the attachment of a fly to a fishing line leader when the lid is open.

12 Claims, 5 Drawing Figures

PATENTED AUG 1 1972 3,680,750
INVENTOR.
LOUIS B. FRANCO
BY
Wells, St. John & Roberts
ATTYS
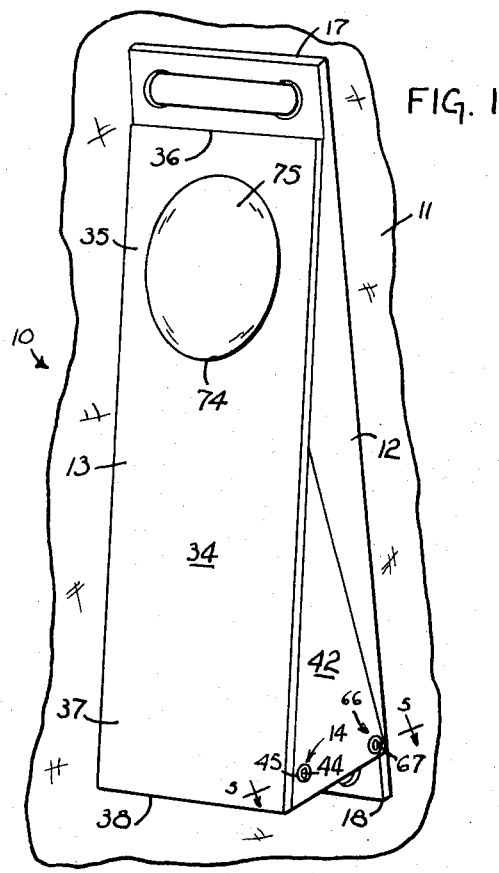
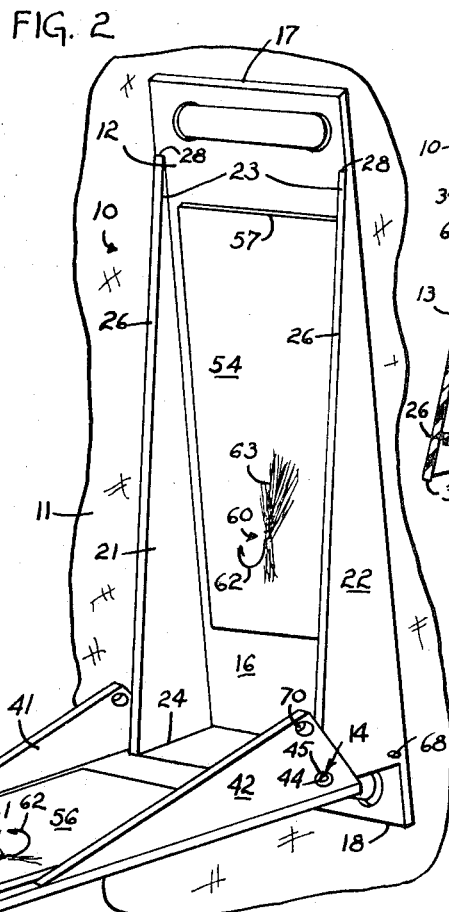
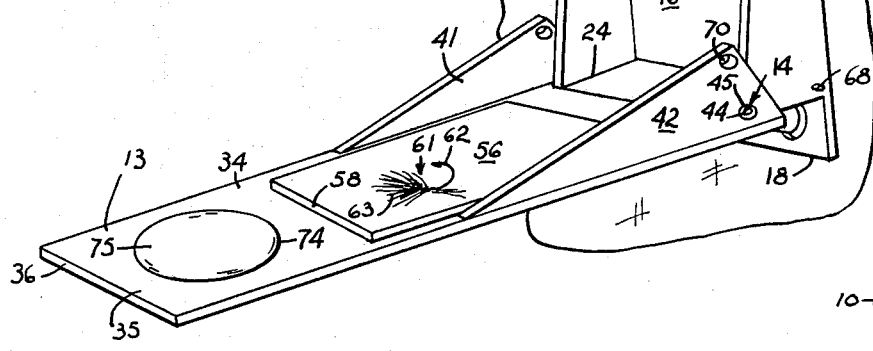
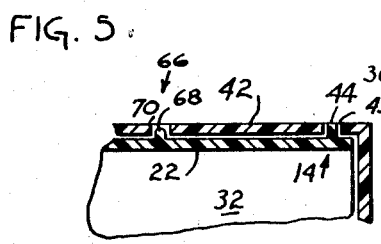

FISHING FLY CASE

BACKGROUND OF THE INVENTION

This invention relates to containers for artificial fishing flies and more particularly to a fishing fly container or case that is attachable to the clothing of the fisherman to be carried by the fisherman while he is fishing.

There has been a substantial need for a long time for a compact case that may be conveniently attached to the clothing of a fisherman for carrying fishing flies. Furthermore, there is a need for a case in which the flies may be readily inspected when the case is opened to pick the fly that the fisherman desires without the necessity of the fisherman using one had to hold the case.

Often fishing fly containers have little or no provisions for maintaining the flies separated within the containers when the containers are carried.

One of the principal objects of this invention is to provide a fishing fly case that is quite compact and may be readily attached to clothing of the fisherman without getting in the way of the movements of the fisherman while he is fishing.

An additional object of this invention is to provide a compact fishing fly case that may be attached to the clothing of the fisherman in which the flies may be conveniently separated within the case by desired characteristics.

A further object of this invention is to provide a compact fishing fly case for attaching the clothing of the fisherman in which the fishing flies are presented in a very visible manner when the case is open to enable the fisherman to readily select the desired fly and to remove the desired fly from the case without disturbing the other flies.

An additional object of this invention is to provide a fishing fly case that includes means for holding the case closed as well as supporting the flies within the case.

A further object of this invention is to provide a fishing fly case that has a relatively small profile to minimize the possibility of the case becoming accidentally opened by contacting brush or other objects as the fisherman moves from the one location to another.

An additional object of this invention is to provide a fishing fly case that may be readily attachable to the clothing of the fisherman without interfering with the arm movements generally associated with fly fishing.

A still further object of this invention is to provide a fishing fly case that may be inexpensively manufactured and assembled and which can be sold within a price range that is within the means of almost any fisherman.

An additional object of this invention is to provide a versatile fishing fly case that is attachable to the fisherman and which has a feature to visually assist the fisherman in tying a fishing fly to a fishing line leader.

These and further objects and advantages of the invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a perspective view of a compact fishing fly case shown mounted to the clothing of a fisherman;

FIG. 2 is a vertical cross-sectional view taken along line 2—2 in FIG. 1;

FIG. 3 is a perspective view similar to FIG. 1 except showing the fishing case opened to expose the fishing flies contained therein;

FIG. 4 is a vertical cross-sectional view taken along line 4—4 in FIG. 3; and

FIG. 5 is a fragmentary cross-sectional view taken along line 5—5 in FIG. 1.

DETAILED DESCRIPTION OF A PREFERRED EMBODIMENT

Referring now in detail to the drawings, there is shown in FIG. 1 a fishing fly case 10 for receiving a plurality of fishing flies. The case 10 is designed to be attached to the clothing 11 of a fisherman. It is recommended that the fishing fly case 10 be attached to the clothing on the upper front portion (chest) of his torso for best possible utilization and convenience.

The fishing fly case 10 has two enclosure members 12 and 13 that are hinged together by a hinge mechanism 14 to cooperate together forming an enclosure. The fishing fly case is capable of housing a good number of flies and make the flies readily accessible to the fisherman when the case is opened. The fishing fly case 10 is designed to be mounted in an upright position as shown in the drawings.

The enclosure member 12 includes an elongated back wall 16 having an upper end 17 and a lower end 18. The enclosure member 12 includes side walls 21 and 22 that are formed integrally with the back wall and extend forward substantially perpendicular to the back wall 16. Each of the side walls 21 and 22 are triangular shaped when viewed from either side. More specifically, the side walls 21 and 22 are in the shape of right triangles with the lower end 24 forming one leg of the right triangle and the back wall forming the other leg of the right triangle. Each side wall 21, 22 has an edge 26 that forms the hypotenuse of the right triangle. The width of the side walls 21, 22 tapers from the lower end 24 to the upper end 23 with the edge 26 intersecting the back wall at an acute angle at intersection 28.

The enclosure member 12 has a bottom wall 32 that is formed integrally with the back wall 16 and the side walls 21 and 22. The bottom wall extends outwardly at substantially perpendicular angles to the back wall 16 interconnecting the side walls 21 and 22. The bottom wall has an edge 33 that communicates with the edge 26 at the lower ends 24 of the side walls.

The enclosure member 13 includes a front wall or lid 34 having an upper end 35 terminating at a top edge 36 and a lower end 37 terminating at a bottom edge 38. Side flanges 41 and 42 are formed integrally with the front wall 34 and extend outward substantially perpendicular to the front wall 34. The distance between the side flanges 41 and 42 is slightly greater than the distance between the side walls 21 and 22 so that when the enclosure member 13 is pivotally mounted on the enclosure member 12 the side flanges 41 and 42 extend along the outside of the side walls 21 and 22 respectively.

The enclosure member 13 is pivotally mounted to the enclosure member 12 by hinge mechanism 14. The hinge mechanism 14 includes projecting stud shafts 44 formed integrally with the side walls 21 and 22 adjacent their lower ends 24. Corresponding apertures 45 are formed in the side flanges 41 and 42 to receive the stud shafts 44 to form the hinge mechanism. The lower end 34 of the front member 13 extends downward below the bottom wall 32. When closed, the front wall 34 engages the edges 26 and the top edge of the front wall 36 bears against the back wall 16 below the upper end 23. When it is desired to open the case 10, the front wall 34 is pivoted downward until the lower end of the front wall engages the bottom wall 32 to provide a stop to limit the pivotal movement of the front wall to somewhat greater than 90°. When the case 10 is open the front wall 32 extends outward at approximately 90° to the back wall 16.

Securing means 48 are provided for attaching the fishing fly case 10 to the clothing 11. The securing means includes two pins 50 and 51 that are mounted on the upper end 23 and the lower end 24 respectively to latch the fishing fly case securely to the clothing at both ends 23 and 24.

The back wall 16 and the front wall 34 have magnetic surfaces 54 and 56 respectively for receiving and securely holding fishing flies hereto. Magnetic surfaces 54 and 56 may be formed integrally with the back wall 16 and the front wall 34 or they may be applied to that wall in a layer or sheet form. One preferable construction is to apply layers of plastic having magnetic impregnated material formed integrally therein to the front wall 34 and the back wall 16. The magnetic surfaces 54 and 56 have upper ends 57 and 58 respectively. A very important feature of this invention is that the magnetic surfaces 54 and 56 sufficiently attract each other when the case is closed to magnetically hold the case in the closed position. The distance between the ends 57 and 58 is sufficiently close so that the magnetic flux generated by such surfaces interact with each other to provide a magnetic bias to hold the case closed.

Additionally, the magnetic surfaces 54 and 56 provide a convenient means for supporting and separating the flies into at least two categories. Some fishermen desire to have their flies segregated into categories such as wet and dry flies. For an example, dry flies 60 may be mounted on magnetic surface 54 and wet flies 61 may be mounted on the magnetic surface 56. When the fisherman desired one of the flies, he merely opens up the case and selects the fly that he desires. The magnetic surfaces 54 and 56 provide an excellent display feature to enable the fisherman to conveniently select the desired fly with a minimum of effort and searching and without disturbing the other flies.

The magnetic surfaces 54 and 56 are sufficiently spaced so that each magnetic surface has a paramount effect on the flies adjacent thereto to hold the flies securely against the magnetic surface and to prevent the flies from dropping to the bottom of the case. Each of the flies 60 and 61 has a magnetically attractable hook 62 with plumage 63 affixed thereto to constitute an artificial fishing lure.

An additional latching mechanism 66 is shown for holding the enclosure member 13 in the closed position. The latch mechanism 66 includes a detent 67 having projections 68 on the side walls 21 and 22 respectively for projecting into apertures 70 formed in the side flanges 71 and 72. As the front wall 34 is pivoted upward from the open position to the closed position the side flanges 41 and 42 ride over the projection 68 until the projections reach the apertures 70.

A hole 74 is formed in the front wall 34 near the upper end 35. A magnifying lens 75 is mounted in the hole 74 so that when the front wall is pivoted downward the fisherman can look down through the magnifying lens to visually assist in attaching a fly to the leader of a fishing line. Most leader material is clear monofiliment material that is very difficult to thread through a small eye in the fly hook. It should be pointed out that with the device the fisherman has the freedom of both hands with which to thread the hook.

As previously mentioned, one of the important features of this invention is the profile of the case to minimize the capability of the case being opened by the fisherman moving through brush and the like when moving to and from a fishing location on a stream or river. Furthermore, the profile of the case enables the fisherman to perform the intricate maneuvers of fly casting without interference. When the fishing fly case is mounted on the chest of the fisherman, the case presents a somewhat triangular wedge shape profile when viewed from the side with the narrow part of the wedge projecting upward so that as the fisherman brings his arms downward in the forward stroke of casting a fly line, he does not hook his arm on the case 10. When the fisherman is moving through brush the thin top profile of the case prevents twigs from engaging the case and either flipping the case open or providing a surface against which the twig can impede the progress of the fisherman.

Although such an invention may appear to be simple in retrospect, one can readily appreciate the substantial improvement that this invention represents when viewed against past efforts that have been expended in attempting to provide such a versatile fishing fly case.

It should be understood that the above described invention is simply illustrative of the principles of the invention and that numerous other embodiments may be readily devised by those skilled in the art without deviating therefrom. Therefore, only the following claims are intended to define this invention.

What is claimed is:

1. A fishing fly case for attaching to the clothing of a fisherman, comprising:
   two enclosure members operatively hinged together to enable one of the enclosure members to pivot from a closed position to an open position;
   each of said enclosure members having an opposing magnetic interior surface that is fully enclosed by the enclosure members when the one enclosure member is in the closed position for receiving and magnetically supporting fishing flies thereon;
   in which at least a portion of the opposing magnetic interior surfaces are in sufficient proximity to each other to attract each other when the one enclosure member is in the closed position to magnetically hold the case closed; and
   means affixed to the other enclosure member for attaching the case to the clothing of the fisherman.

2. The fishing fly case as defined in claim 1 wherein the case when attached to the clothing is oriented upright with each enclosure member having an upper end and a pivotally interconnected lower end in which the upper end of the other enclosure member extends above the upper end of the one enclosure member.

3. The fishing fly case as defined in claim 1 wherein the the case when attached to the clothing is oriented upright with each enclosure member having a pivotally interconnected lower end and an upper end that comes together with the other upper end when the case is closed in which the enclosure members have walls intermediate the ends that are inclined to each other with the magnetic interior surfaces on the walls to support the fishing flies and to magnetically attract each other when the case is closed to hold the case closed.

4. The fishing fly case as defined in claim 1 wherein the other enclosure member has a back wall, side walls that extend outward from the back wall, and a bottom wall interconnecting the side walls and extending outward from the back wall and wherein the one enclosure member has a front wall that cooperates with the back, side and bottom wall of the other enclosure member to form an enclosure.

5. The fishing fly case as defined in claim 4 wherein the back wall and front wall have magnetic interior surfaces for receiving and supporting the fishing flies.

6. The fishing fly case as defined in claim 5 wherein the front wall and the back wall are inclined to each other to bring portions of the magnetic interior surfaces into sufficiently close proximity to each other when the case is closed to attract each other and magnetically hold the case closed.

7. The fishing fly case as defined in claim 4 wherein the back wall has an upper end and wherein the front wall has an edge that engages the back wall below the upper end when the case is closed to prevent obstacles such as twigs from engaging the edge to open the case while the fisherman is moving past the obstacles.

8. The fishing fly case as defined in claim 7 wherein the front wall is oriented at an acute angle to the back wall when the case is closed.

9. A fishing fly case for attaching to the clothing of a fisherman to enable the fisherman to carry a number of fishing flies with him while he is fishing, said case comprising:

a first enclosure member having a back wall, two side walls that extend outward from the back wall and a bottom wall extending outward from the back wall interconnecting the side walls;

a second enclosure member having a front wall with a lower end and an upper end in which the second enclosure member is pivotally mounted to the first enclosure member adjacent the lower end of the front wall to enable the second enclosure to pivot with respect to the first enclosure to open and close the case with the upper end of the front wall engaging the back wall when the case is closed;

means affixed on the first enclosure member for attaching the case to the clothing;

opposing magnetic surfaces formed on the interior of the front and back walls for magnetically supporting fishing flies in the interior of the case; and said front and back walls being of sufficient proximity to each other when the case is closed to cause the opposing magnetic surfaces to magnetically attract each other to hold the case closed.

10. A fishing fly case for attaching to the clothing on the chest of a fisherman, comprising:

an enclosure for receiving and supporting fishing flies therein;

means affixed to the enclosure for attaching the enclosure to the clothing on the chest of a fisherman to enable the fisherman to have both hands free to tie a fishing fly to a fishing line leader;

said enclosure having a lid that is pivotable from a closed position to an open position with the lid projecting outward in front of the fisherman; and a magnifying lens affixed to the lid to enable the fisherman to look down through the lens when the lid is in the open position to visually facilitate the attachment of the fishing fly to the fishing line leader.

11. The fishing case as defined in claim 10 wherein the enclosure and lid have interior magnetic surfaces for supporting fishing flies thereon in which the magnetic surfaces are in sufficient proximity to each other when the lid is in the closed position to magnetically attract each other and hold the case closed.

12. The fishing case as defined in claim 10 wherein the lid has a hole formed there through and wherein the lens is mounted in the hole to enable the fisherman to look down through the hole to view the attachment of the fishing line leader to the fishing fly.

* * * * *